(12) United States Patent
Eddy et al.

(10) Patent No.: US 8,782,348 B2
(45) Date of Patent: Jul. 15, 2014

(54) MICROPROCESSOR CACHE LINE EVICT ARRAY

(75) Inventors: Colin Eddy, Round Rock, TX (US); Rodney E. Hooker, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 1370 days.

(21) Appl. No.: 12/207,261

(22) Filed: Sep. 9, 2008

(65) Prior Publication Data
US 2010/0064107 A1    Mar. 11, 2010

(51) Int. Cl.
*G06F 12/08* (2006.01)

(52) U.S. Cl.
CPC ........ *G06F 12/0811* (2013.01); *G06F 12/0804* (2013.01); *G06F 2212/1056* (2013.01); *G06F 12/0831* (2013.01); *G06F 12/0859* (2013.01)
USPC ............ 711/146; 711/141; 711/122; 711/133

(58) Field of Classification Search
CPC .................................................. G06F 12/0811
See application file for complete search history.

(56) References Cited

U.S. PATENT DOCUMENTS

| | | | | |
|---|---|---|---|---|
| 5,293,603 A * | 3/1994 | MacWilliams et al. | | 711/117 |
| 5,680,576 A * | 10/1997 | Laudon | | 711/145 |
| 5,751,993 A * | 5/1998 | Ofek et al. | | 711/136 |
| 5,829,038 A * | 10/1998 | Merrell et al. | | 711/143 |
| 6,266,743 B1 * | 7/2001 | Carpenter et al. | | 711/143 |
| 6,378,048 B1 * | 4/2002 | Prudvi et al. | | 711/144 |
| 6,591,393 B1 * | 7/2003 | Walker et al. | | 714/763 |
| 6,622,267 B1 * | 9/2003 | Zhang | | 714/53 |
| 6,725,343 B2 * | 4/2004 | Barroso et al. | | 711/145 |
| 7,640,401 B2 * | 12/2009 | Tsien | | 711/141 |
| 2002/0129208 A1 * | 9/2002 | Barroso et al. | | 711/141 |
| 2003/0126373 A1 * | 7/2003 | David | | 711/143 |
| 2004/0088495 A1 * | 5/2004 | Glasco et al. | | 711/141 |
| 2004/0088496 A1 * | 5/2004 | Glasco et al. | | 711/141 |
| 2007/0005899 A1 * | 1/2007 | Sistla et al. | | 711/134 |
| 2007/0156971 A1 * | 7/2007 | Sistla et al. | | 711/141 |
| 2008/0109606 A1 * | 5/2008 | Lataille et al. | | 711/133 |
| 2008/0120469 A1 * | 5/2008 | Kornegay et al. | | 711/133 |
| 2008/0162818 A1 * | 7/2008 | Okawa et al. | | 711/122 |

* cited by examiner

*Primary Examiner* — Matthew Bradley
*Assistant Examiner* — Ramon A Mercado
(74) *Attorney, Agent, or Firm* — E. Alan Davis; James W. Huffman

(57) ABSTRACT

An apparatus for ensuring data coherency within a cache memory hierarchy of a microprocessor during an eviction of a cache line from a lower-level memory to a higher-level memory in the hierarchy includes an eviction engine and an array of storage elements. The eviction engine is configured to move the cache line from the lower-level memory to the higher-level memory. The array of storage elements are coupled to the eviction engine. Each storage element is configured to store an indication for a corresponding cache line stored in the lower-level memory. The indication indicates whether or not the eviction engine is currently moving the cache line from the lower-level memory to the higher-level memory.

39 Claims, 7 Drawing Sheets

MICROPROCESSOR CACHE LINE EVICT ARRAY

FIELD OF THE INVENTION

The present invention relates in general to microprocessors, and more particularly to ensuring data coherency within a cache memory hierarchy of a microprocessor during an eviction of a cache line from a lower-level memory to a higher-level memory in the hierarchy.

BACKGROUND OF THE INVENTION

Modern microprocessors have one or more internal cache memories to reduce average access time to microprocessor memory. Cache memories come in many different organizations and sizes, but generally have a data storage area and an address storage area. The data storage area is typically organized as a cache line of a number of bytes. In one embodiment, the cache line is 64 bytes. Caches may be specific to either instructions or data, or may be organized as a unified cache that stores both instructions and data. Cache memories are arranged hierarchically. In a microprocessor with Level1 (L1) and Level 2 (L2) caches, the L1 cache is the fastest cache to access, and is the first cache memory consulted when looking for an instruction or data in the memory subsystem of a microprocessor. L2 caches are typically larger and slower than L1 caches.

Data is stored in a cache line of a lower level cache memory (e.g., an L1 cache) from system memory or a higher level cache memory (e.g., L2 cache in a microprocessor having L1 and L2 caches), usually in response to a cache miss. Cache misses occur when a read (load) or write (store) operation attempts to access the cache, but the address it is reading from or writing to is not in the cache. For a load instruction, the microprocessor will usually load data from the L2 cache or system memory (wherever the data is present in the fastest accessible form) into an available cache line in L1 cache. For a store instruction, the microprocessor will usually store data directly to the L1 cache if an available cache line is present. If an available cache line is not present, the microprocessor may evict data from an L1 cache line to a higher level L2 cache line, according to the cache line replacement policy being used by the cache memory. In one embodiment, the cache replacement policy is LRU (least recently used).

If the replacement policy is free to choose any entry in the cache to hold the copy, the cache is fully associative. If each entry in main memory can go in just one place in the cache, the cache is direct mapped. Many microprocessor caches implement a compromise, and are described as associative. In a 2-way set associative cache memory, any particular location in main memory can be cached in either of 2 cache lines in the cache. In a 4-way set associative cache memory, any particular location in main memory can be cached in either of 4 cache lines in the cache.

Cache lines are evicted from an L1 cache by microprocessor circuitry that selects an L1 cache line to evict, reads the cache line from L1 cache, writes the cache line to an available cache line in an L2 cache, and invalidates the cache line status in L1 cache. One protocol for cache line status is the MESI protocol, which is a widely used cache coherency and memory coherence protocol. MESI designates four possible states for each of the cache lines in the cache memory: Modified, Exclusive, Shared, or Invalid. A Modified cache line is present only in the current cache, and it has been modified from the value in main memory. The cache memory is required to write the data back to main memory at some time in the future, before permitting any other read of the (no longer valid) main memory state. An Exclusive cache line is present only in the current cache, but is up to date and matches main memory. A Shared cache line indicates that the cache line may be stored in other caches of the system. An Invalid cache state indicates that this cache line is invalid, and the contents do not represent a reliable data value. Evicted cache lines have an Invalid MESI status following eviction.

Cache line eviction from a lower level cache memory to a higher level cache memory usually takes multiple microprocessor clock cycles. Cache memories are often located relatively far apart in the microprocessor and the data payload of a single move is sometimes less than the size of a cache line. Often, there are other store or cache snoop operations that are directed to data in cache fully or partially within the same cache line as the line being evicted from cache. It is necessary for the store or snoop to know the state of the eviction process for the implicated cache line. If the store or snoop is allowed to continue without knowledge of the eviction operation, it is possible that data that has not yet been evicted will be overwritten by a store, or the cache line will be invalidated. Either will result in data corruption.

To solve this problem, microprocessors typically determine if a cache line is in the process of being evicted from a lower level cache to a higher level cache by comparing the address of store operations in the instruction pipeline directed to the cache, to the address of the evicted cache line. The address of the evicted cache line must be temporarily stored in the microprocessor until the store addresses have been compared. Addresses may either be compared serially or in parallel. Comparing many addresses in parallel requires many compare circuits and other logic to provide compared results to the microprocessor from all of the compare circuits. Comparing many addresses serially requires significant time for many store instructions, which slows cache eviction operations and cache performance. Therefore, what is needed is a way for a microprocessor to rapidly identify cache lines that are in the process of being evicted from a lower level cache to a higher level cache, without requiring the addition of significant amount of hardware for address comparison.

BRIEF SUMMARY OF INVENTION

In one aspect, the present invention provides an apparatus for ensuring data coherency within a cache memory hierarchy of a microprocessor during an eviction of a cache line from a lower-level memory to a higher-level memory in the hierarchy. The apparatus includes an eviction engine, configured to move the cache line from the lower-level memory to the higher-level memory. The apparatus also includes an array of storage elements, coupled to the eviction engine, each configured to store an indication for a corresponding cache line stored in the lower-level memory. The indication indicates whether or not the eviction engine is currently moving the cache line from the lower-level memory to the higher-level memory.

In another aspect, the present invention provides a method for ensuring data coherency within a cache memory hierarchy of a microprocessor during an eviction of a cache line from a lower-level memory to a higher-level memory in the hierarchy. The method includes moving the cache line from the lower-level memory to the higher-level memory. The moving is performed by an eviction engine. The method includes storing into an array of storage elements an indication for a corresponding cache line stored in the lower-level memory.

The indication indicates whether or not the eviction engine is currently moving the cache line from the lower-level memory to the higher-level memory.

In another aspect, the present invention provides a computer program product for use with a computing device. The computer program product includes a computer usable storage medium, having computer readable program code embodied in the medium, for specifying a microprocessor configured to ensure data coherency within a cache memory hierarchy of a microprocessor during an eviction of a cache line from a lower-level memory to a higher-level memory in the hierarchy. The computer readable program code includes first program code for specifying an eviction engine, configured to move the cache line from the lower-level memory to the higher-level memory. The computer readable program code includes second program code for specifying an array of storage elements, configured to store an indication for a corresponding cache line stored in the lower-level memory. The indication indicates whether or not the eviction engine is currently moving the cache line from the lower-level memory to the higher-level memory.

An advantage of the present invention is that it may require less hardware than related art microprocessors to determine if a cache line is being evicted from a lower level cache memory to a higher level cache memory in the cache memory hierarchy of a microprocessor. Related art microprocessors store and compare the address of the evicted cache line to the addresses of store and snoop operations directed to the lower level cache memory from which the cache line is being evicted. This requires many address comparators and control logic, and possibly significant time to perform the number of required address compares. The present invention requires only a check of a single bit in an evict array to determine if the cache line is being evicted. The requirement of storing addresses of cache lines to be evicted is greatly reduced because the evict array identifies which set/way of the cache is being evicted, if any, and the set/way in the tag array corresponding to the set/way of the evict array that outputs a true bit value supplies the address of the cache line that is being evicted.

Another advantage of the present invention is that it eliminates the need to continuously compare store and snoop addresses to the address of cache lines being evicted from a lower level cache to a higher level cache. Cache line evictions in progress do not need to be determined until a store or snoop operation starts. A single lookup to the evict array of the lower level cache is all that is required, and the lookup completes at the access time of the lower level cache memory.

Another advantage of the present invention is it reduces timing pressure on the circuits that determine if a specific cache line is being evicted. Stores are delayed until the microprocessor has determined that the cache line to which the store operation is directed is being evicted, since the store operation would overwrite and possibly corrupt the cache line being evicted. It is potentially faster to read a single bit from an evict array than to compare addresses of multiple stores to determine if a cache line is being evicted. Microprocessor store and snoop operations can complete faster since cache line eviction with the present invention can be determined faster than related art methods.

Yet another advantage of the present invention is it reduces accesses to the tag array (or tag arrays in embodiments that includes multiple tag arrays), particularly because the eviction engine does not have to access the tag array until the cache line is fully evicted from the lower-level cache to the higher-level cache; this is because the eviction engine can simply access the evict array to determine whether an eviction is in progress for the specified cache line.

DETAILED DESCRIPTION OF THE INVENTION

Figure 1:
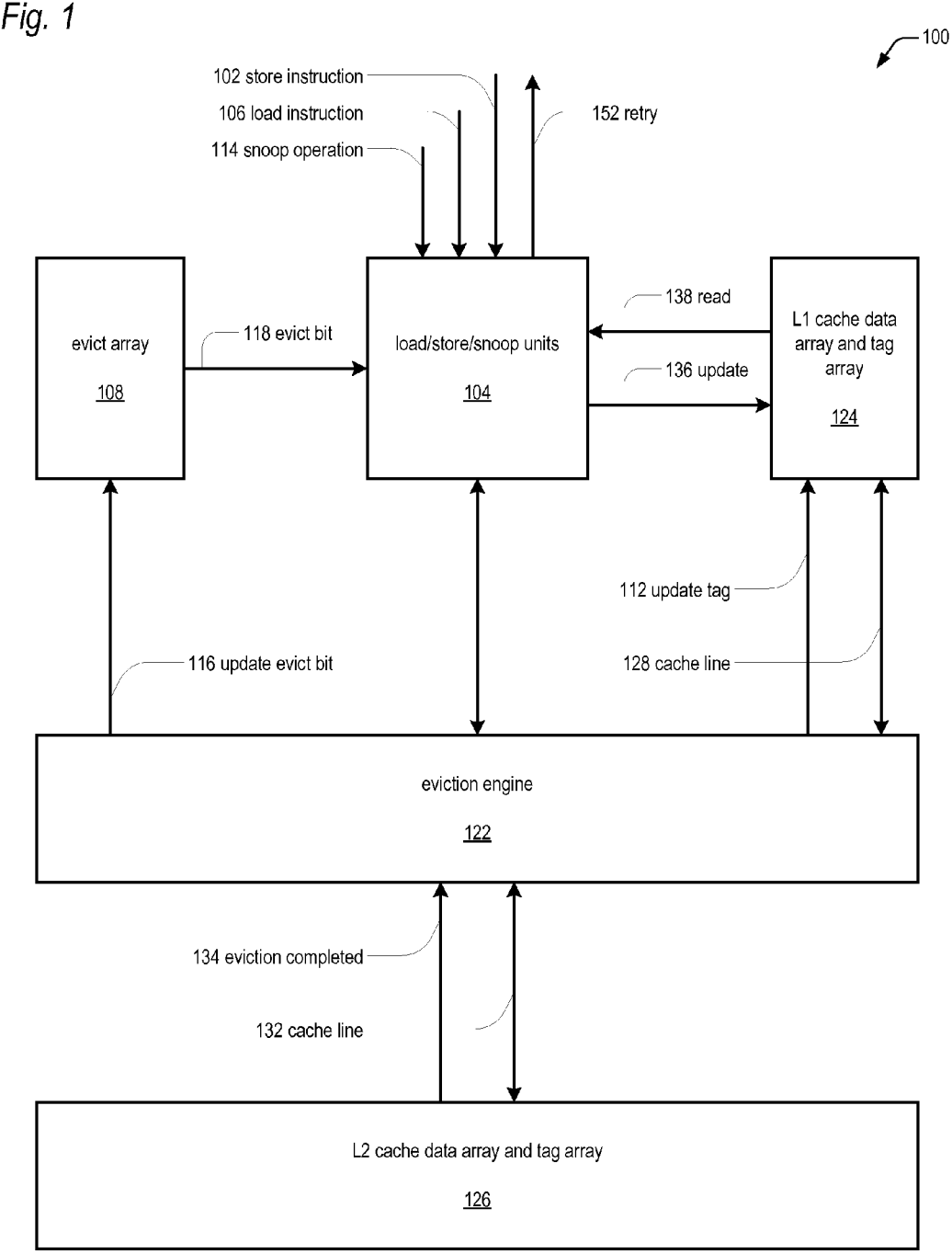
FIG. 1 is a block diagram illustrating a microprocessor according to the present invention.

Referring now to FIG. 1, a block diagram illustrating a microprocessor 100 according to the present invention is shown. The Microprocessor 100 includes an eviction engine 122 that manages cache line eviction operations from a lower level cache memory to a higher level cache memory in a cache memory hierarchy of the microprocessor 100. The higher level cache memory and the lower level cache memory are exclusive. That is, each of the higher level and lower level caches retain different cache lines, with no overlap between the cache lines of the higher level and lower level cache memories. In one embodiment, the lower level cache memory is an L1 cache data array and tag array 124 and the higher level cache memory is an L2 cache data array and tag array 126. For brevity, the L1 cache data array and tag array 124 are referred to as the L1 cache 124, and the L2 cache data array and tag array 126 are referred to as the L2 cache 126 herein.

The microprocessor 100 also includes an evict array 108 that the eviction engine 122 updates to indicate whether or not a cache line is being evicted from the L1 cache 124 to the L2 cache 126. The evict array 108 is an array of storage locations that has the same organization with respect to sets and ways as the lower level cache memory from which cache lines are evicted, which in the case of the embodiment of FIG. 1 is the L1 cache 124. The similarity in organization between the evict array 108 and the data array and tag array of the L1 cache 124 is shown in more detail in FIG. 6.

Figure 6:
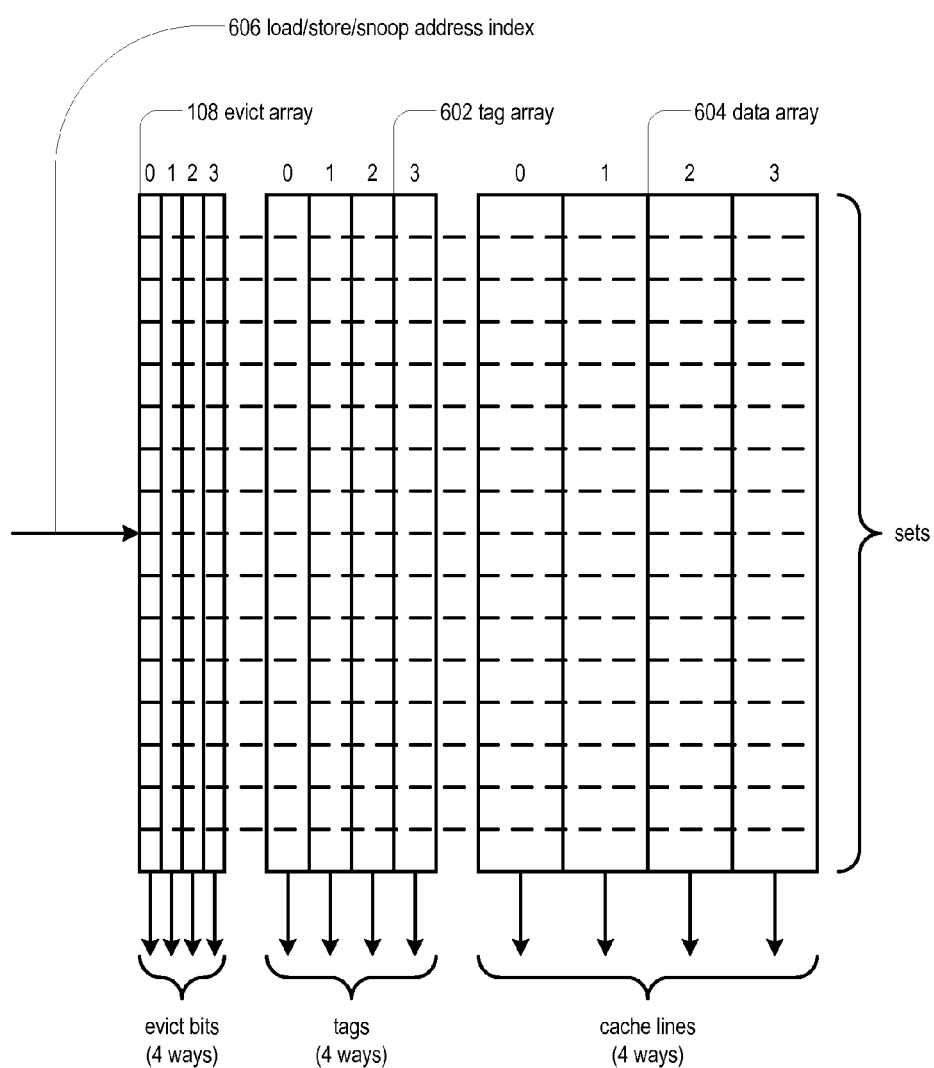
FIG. 6 is a block diagram of the organization of an embodiment of the evict array, tag array, and data array of the present invention.

Referring now to FIG. 6, a block diagram of the organization of an embodiment of the evict array 108 of FIG. 1, a tag array 602, and a data array 604 of the present invention is shown. Each storage element of the evict array 108 includes a bit that the eviction engine 122 updates to a true value via an update evict bit line 116 of FIG. 1 prior to commencing the process of evicting a corresponding cache line from the L1 cache 124 to the L2 cache 126, and which bit the eviction engine 122 updates to a false value after the eviction engine 122 has completed the eviction, i.e., once the L2 cache 126 has taken ownership of the cache line. In the embodiment shown in FIG. 6, each of the data array 604, tag array 602, and evict array 108 are organized as a plurality of corresponding sets. Each of the arrays 604/602/108 is accessed by an index portion of a load/store/snoop address 606 that selects one of the pluralities of sets. Each set includes 4 ways of storage elements for storing a cache line, address tag and MESI state, and evict bit in the data array 604, the tag array 602, and the evict array 108, respectively. Thus, during each access, the data array 604 outputs 4 cache lines, the tag array 602 outputs 4 tags, and the evict array 108 outputs 4 evict bits. A respective multiplexer (not shown) at the output of each array 604/602/108 selects one of the 4 outputs in response to a select signal that indicates which of the 4 ways, if any, has a tag that matched the tag portion of the load/store/snoop address 606. In one embodiment, the evict array 108 is a write-through array. That is, a read of a location in the evict array 108 that is being written at the same time receives the value being written. In another embodiment, the evict array 108 detects collisions between a read from and a write to the same location in the evict array 108. In this case, the evict array 108 causes the read to be replayed.

Referring again to FIG. 1, the eviction engine 122 contains one or more buffers to provide temporary storage of data. The buffers store cacheable data and address and status information pertaining to the data. In addition to temporary storage of data, the eviction engine 122 also includes state machines that manage eviction of cache lines from the L1 cache 124 to the L2 cache 126. The microprocessor 100 also includes an allocation engine (not shown) that allocates cache lines from the L2 cache 126 to the L1 cache 124. The eviction engine 122 is coupled to the L1 cache 124, the L2 cache 126, the load/store/snoop units 104, and the evict array 108. The L1 cache 124 and the L2 cache 126 contain storage for cache lines as well as a tag for each cache line. The tags include an address tag and the MESI state for the corresponding cache line.

Although two cache memories are shown in the cache memory hierarchy of FIG. 1 with a single evict array 108 that indicates whether evictions of cache lines from the L1 cache 124 to the L2 cache 126 are in progress, other embodiments are contemplated that have more than two cache memories, and in which multiple evict arrays are employed for indicating evictions from each lower-level cache memory to its respective higher-level cache memory in the hierarchy. In these embodiments, the set/way organization of each evict array is the same as each respective lower-level cache memory. Thus, for example, in an embodiment in which the microprocessor 100 also includes a level-3 cache memory above the L2 cache 126, the microprocessor 100 would include a second evict array that has the same set/way organization as the L2 cache 126 and that indicates whether cache lines are being evicted from the L2 cache 126 to the level-3 cache.

Microprocessor 100 includes the load/store/snoop units 104. The load unit 104 loads data from main memory or cache memories to registers of microprocessor 100. The store unit 104 stores data from registers of the microprocessor 100 to main memory or cache memories. The snoop unit 104 services snoop transactions detected on the microprocessor bus to maintain cache coherency between the various cache memories of the system. The load/store/snoop units 104 read cache lines and tags from the L1 cache 124 via a read line 138 and updates the cache lines and tags to the L1 cache 124 via an update line 136. Additionally, the store/snoop units 104 read the evict bits 118 from the evict array 108. Still further, the snoop unit 104 generates a true value on a retry line 152 to instruct to a bus interface unit (not shown) of the microprocessor 100 to retry a snoop operation on the microprocessor 100 bus, as described in more detail below. In one embodiment, the load/store/snoop units 104 may be a single monolithic group of circuits that handle all microprocessor 100 load instructions 106, store instructions 102, and snoop operations 114; whereas, in other embodiments the load/store/snoop units 104 are separate units.

Replacement policy algorithms in the microprocessor 100 detect that a different cache line is more likely to be referenced by the microprocessor 100 than a current cache line, which causes the eviction engine 122 to evict the current cache line from the L1 cache 124 to the L2 cache 126. The load/store/snoop units 104 read the appropriate evict bit 118 from the evict array 108 to determine whether or not the eviction engine 122 is currently evicting a cache line containing data specified by a store instruction 102 or snoop operation 114.

After the eviction engine 122 sets the evict array bit in the evict array 108 corresponding to the cache line being evicted, the eviction engine 122 reads the cache line 128 from the L1 cache 124. After reading the cache line 128 from the L1 cache 124, the eviction engine 122 writes the cache line 132 to the L2 cache 126. The L2 cache 126 generates a true value on an eviction completed line 134 to the eviction engine 122 in response to the entire evicted cache line 132 being written to the L2 cache 126. The eviction engine 122 indicates the end of the cache line eviction by clearing the corresponding eviction bit via the update evict bit 116 to the evict array 108. Additionally, the eviction engine 122 updates the tags within the L1 cache 124 via an update tag line 112. For example, according to one embodiment, the eviction engine 122 updates the tag to an Invalid MESI state after evicting a cache line from the L1 cache 124 to the L2 cache 126.

In one embodiment, the load/store/snoop units 104 include separate load and store pipelines. The eviction engine 122 generates operations that arbitrate for access to these two pipelines in order to perform various operations previously described with respect to FIG. 1 and the following flowcharts. The load pipeline receives the load instructions 106 and responsively reads the specified data from the L1 cache 124. The store pipeline receives the store instructions 102 and the snoop operations 114 and responsively reads tags from the L1 cache 124 and updates the tags and cache lines as needed. The evict array 108 has a read port and a write port. In one embodiment, the evict array 108 read port is coupled to the store pipeline and the evict array 108 write port is coupled to the load pipeline. Store operations and snoop query operations read the evict array 108 to determine if the cache line implicated by the current store or snoop is currently being evicted from the L1 cache 124. Because the write port of the evict array 108 is coupled to the load pipeline, the eviction engine 122 generates an evict array 108 update to the load pipeline, which arbitrates for access to the load pipeline along with outstanding load instructions 106. The load pipeline responsively sets or clears the evict array bit associated with the cache line being evicted from the L1 cache 124 to the L2 cache 126.

When processing a load instruction 106, the microprocessor 100 does not need to access the evict array 108. Rather, the microprocessor 100 reads the tag array of the L1 cache 124 to determine whether the L1 cache 124 has ownership of the cache line containing the data specified by the load instruction 106. This will be further shown and described in FIG. 3b.

Figure 2:
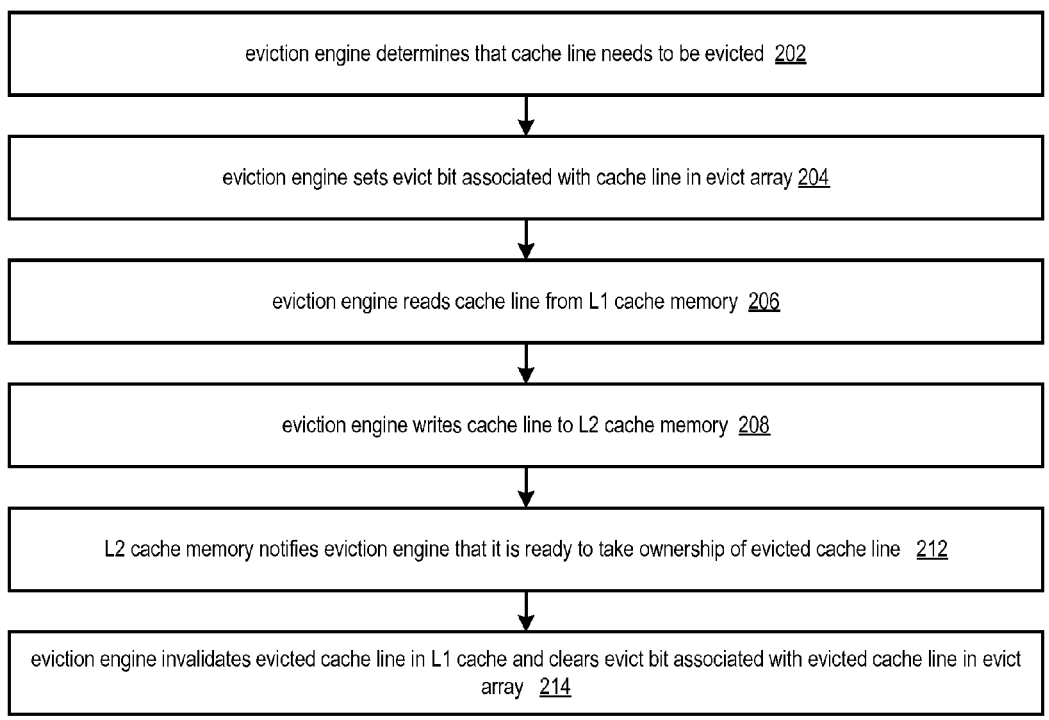
FIG. 2 is a flowchart illustrating the cache line eviction process according to the present invention.

Referring now to FIG. 2, a flowchart illustrating the cache line eviction process according to the present invention is shown. Flow begins at block 202.

At block 202, the eviction engine 122 determines that a cache line needs to be evicted. For example, the microprocessor 100 may select a cache line for eviction when the load/ store/snoop units 104 have store data that is expected to be accessed more frequently than a current cache line. Flow proceeds to block 204.

At block 204, the eviction engine 122 sets the evict bit in the evict array 108 associated with the cache line to be evicted via the update evict bit line 116. The evict array 108 has the same organization as cache lines in the L1 cache 124, with one evict bit associated with each cache line in the L1 cache 124. Flow proceeds to block 206.

At block 206, the eviction engine 122 reads the cache line 128 being evicted from the L1 cache 124. Flow proceeds to block 208.

At block 208, the eviction engine 122 writes the cache line 132 being evicted to the L2 cache 126. In one embodiment, the size of a cache line is wider than the bus between the eviction engine 122 and the L1 cache 124 and/or the L2 cache 126; therefore, the eviction engine 122 reads the cache line 128 using multiple read operations from the L1 cache 124 at block 206 and writes the cache line 132 using multiple write operations to the L2 cache 126 at block 208. In one embodiment, the eviction engine 122 performs the multiple operations serially; in another embodiment, the eviction engine 122 performs the multiple operations in a pipelined manner. Flow proceeds to block 212.

At block 212, the L2 cache 126 notifies the eviction engine 122 that it is ready to take ownership of the evicted cache line by generating a true value on the eviction completed line 134. The eviction completed 134 is generated by the L2 cache 126 in response to the completion of the write in block 208. Flow proceeds to block 214.

At block 214, the eviction engine 122 invalidates the evicted cache line in the L1 cache 124 via the update tag line 112 and clears the evict bit in the evict array 108 associated with the evicted cache line via the update evict bit line 116. The eviction engine 122 invalidates the entry in the L1 cache 124 previously storing the evicted cache line by writing the tag of the L1 cache 124 corresponding to the invalidated cache line to a MESI state of Invalid. Flow ends at block 214.

Figure 3A:
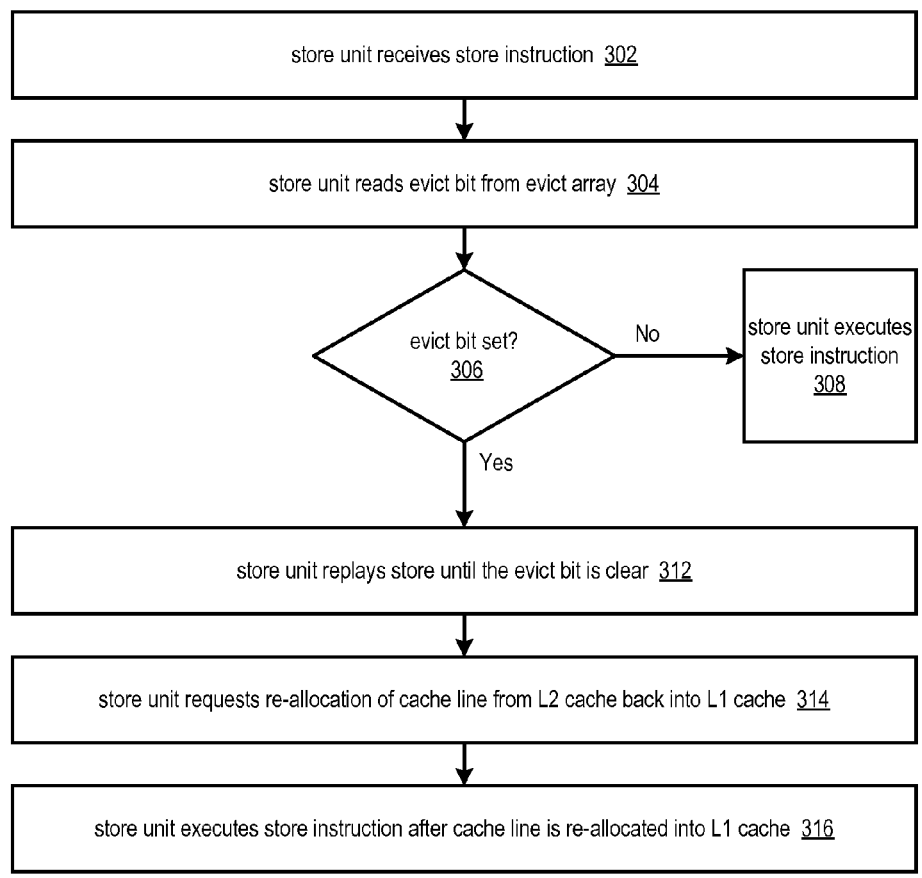
FIG. 3a is a flowchart illustrating a store operation of the microprocessor during a cache line eviction operation according to the present invention.

Referring now to FIG. 3*a*, a flowchart illustrating a store operation of the microprocessor 100 during a cache line eviction operation according to the present invention is shown. Flow begins at block 302.

At block 302, the store unit in the load/store/snoop units 104 receives a store instruction 102, and responsively generates a store operation. The store instruction 102 specifies an address of a memory location to which the microprocessor 100 will write store data from a register of the microprocessor 100. The store address implicates a cache line that may be present in the L1 cache 124. Flow proceeds to block 304.

At block 304, the store unit accesses the L1 cache 124 with the store address specified by the store instruction 102. If the tag portion of the store address matches a tag in one of the ways of the tag array selected by the index portion of the store address and the MESI state of the tag is other than Invalid, the L1 cache 124 indicates a hit, which indicates the store instruction 102 is directed to a cache line present in the L1 cache 124 data array. The store unit also accesses the evict array 108 using the address of the store instruction 102 to read the corresponding evict bit 118 of the cache line from the evict array 108. Flow proceeds to decision block 306.

At decision block 306, the store unit evaluates the evict bit 118. If the evict bit 118 is set, then the eviction engine 122 is currently evicting the corresponding cache line, and flow proceeds to block 312. If the evict bit 118 is not set, then a cache line eviction operation is in not in progress for the cache line corresponding to the evict bit 118, and flow proceeds to block 308.

At block 308, the store unit in the load/store/snoop units 104 executes the store instruction 102 normally since there is no eviction of the associated cache line in progress. In particular, if the store instruction 102 is directed to a cache line present in the L1 cache 124, the store unit writes the store data to the cache line in the L1 cache 124 data array, writes the tag portion of the store address to the tag array, and updates the MESI state in the tag array appropriately. However, if the store instruction 102 is directed to a cache line missing in the L1 cache 124, the allocation engine (not shown) allocates a cache line in the L1 cache 124, reads the missing cache line 132 from the L2 cache 126 (or system memory), and writes the cache line 128 to the L1 cache 124. Furthermore, if the store instruction 102 is directed to a cache line with a Shared MESI state, the allocation engine updates the cache line to the Modified MESI state. Flow ends at block 308.

At block 312, the store unit replays the store operation until the evict bit 118 is cleared. The store operation is replayed by causing the store operation to re-arbitrate for access to the store unit pipeline, effectively performing the same operations as described with respect to block 304 and decision block 306 until the evict bit 118 is clear. Flow proceeds to block 314.

At block 314, the store unit in the load/store/snoop units 104 requests re-allocation of the cache line from the L2 cache 126 back into the L1 cache 124. The allocation engine performs re-allocation at the request of the store unit. The reload of the cache line from the L2 cache 126 to the L1 cache 124 is required since the L1 cache 124 must own the cache line before stores are allowed to that cache line. Additionally, stores are smaller in size than a full cache line, and the data in the cache line that is not part of the store operation must be in a known state. Flow proceeds to block 316.

At block 316, the store unit in the load/store/snoop units 104 executes the store instruction 102 after the cache line is re-allocated into the L1 cache 124. Flow ends at block 316.

Figure 3B:
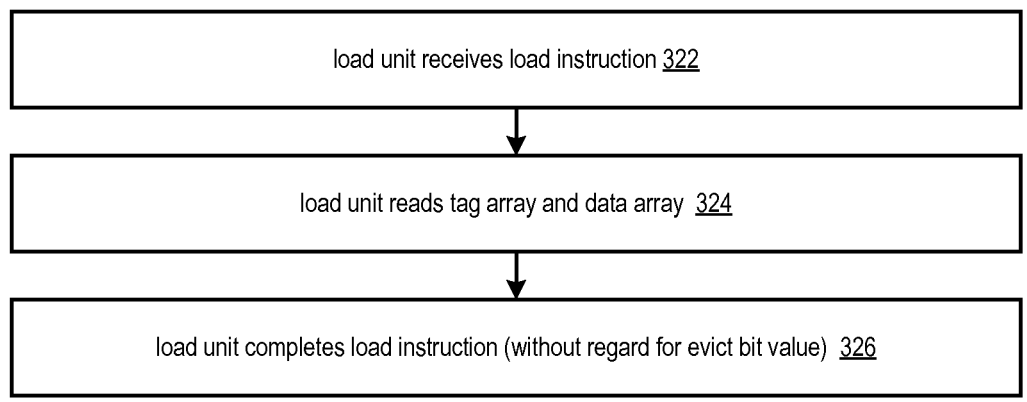
FIG. 3b is a flowchart illustrating a load operation of the microprocessor during a cache line eviction operation according to the present invention.

Referring now to FIG. 3*b*, a flowchart illustrating a load operation of the microprocessor during a cache line eviction operation according to the present invention is shown. Flow begins at block 322.

At block 322, the load unit in the load/store/snoop units 104 receives a load instruction 106. Flow proceeds to block 324.

At block 324, the load unit reads the tag array and data array of the L1 cache 124, at the address specified in the load instruction 106. The load instruction 106 specifies an address of a memory location to which the microprocessor 100 will read load data to a register of the microprocessor 100. The load address implicates a cache line that may be present in the L1 cache 124. Flow proceeds to block 326.

At block 326, the load unit completes the load instruction 106. The evict bit value for the cache line addressed by the load instruction 106 does not matter since the cache line is being read from the L1 cache 124. As long as the cache line is present in the L1 cache 124 and the MESI state of the cache line is not Invalid, the load instruction will complete normally. Flow ends at block 326.

Figure 4:
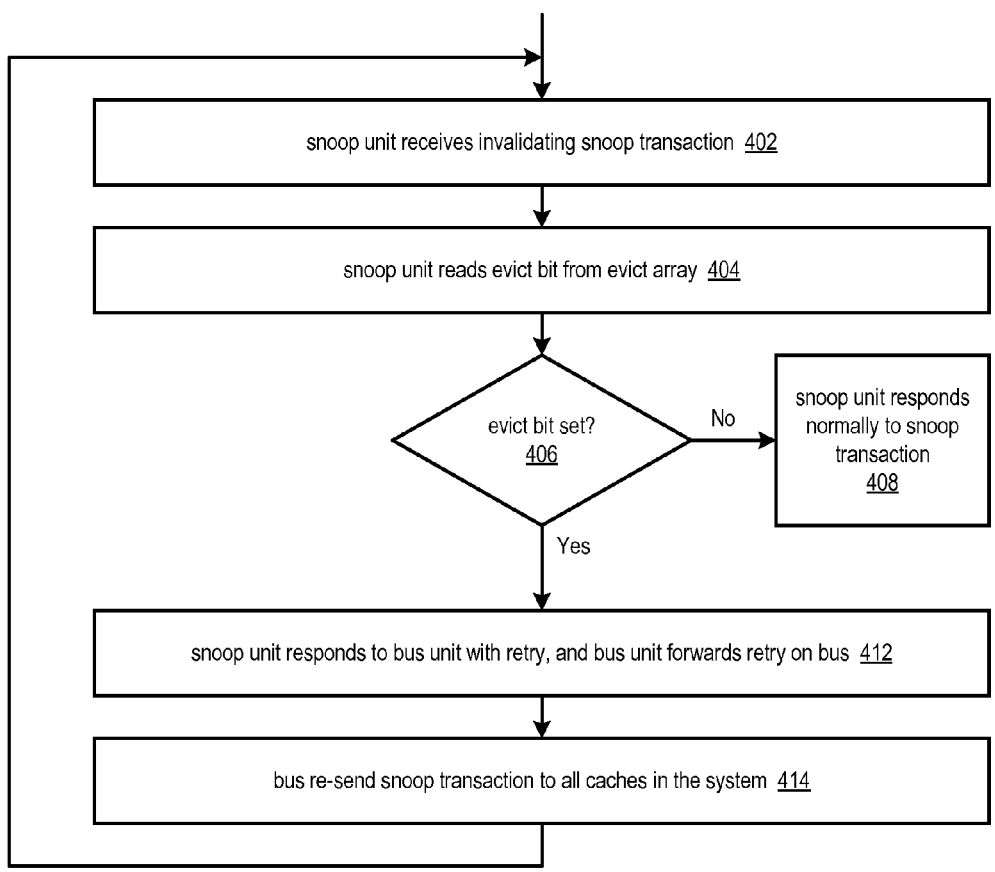
FIG. 4 is a flowchart illustrating a snoop operation of the microprocessor during a cache line eviction operation according to the present invention.

Referring now to FIG. 4, a flowchart illustrating a snoop operation of the microprocessor 100 during a cache line eviction operation according to the present invention is shown. The snoop operation 114 causes a cache memory to invalidate the cache line at the address designated by the snoop operation 114, if the address is present in the cache. Flow begins at block 402.

At block 402, the snoop unit in the load/store/snoop units 104 receives a snoop operation 114, and responsively generates a snoop query operation. The snoop unit receives the snoop operation 114 from a bus interface unit (not shown) of the microprocessor 100 in response to the bus interface unit receiving an snoop operation 114 on the microprocessor 100 bus. The snoop operation 114 specifies an address of the cache line to be invalidated, which may be present in the L1 cache 124. Flow proceeds to block 404.

At block 404, the snoop query operation reads the L1 cache 124 tag array to determine whether the snoop operation 114 is directed to a valid cache line in the L1 cache 124. The snoop unit also reads the evict bit 118 in the evict array 108 corresponding to the cache line specified by the snoop address. Flow proceeds to decision block 406.

At decision block 406, the snoop unit evaluates the evict bit 118 read at block 404. If the evict bit 118 is set, then a cache line eviction operation is in progress for the cache line corresponding to the evict bit 118, and flow proceeds to block 412. If the evict bit 118 is not set, then a cache line eviction operation is in not in progress for the cache line corresponding to the evict bit 118, and flow proceeds to block 408.

At block 408, the snoop unit responds normally to the snoop operation 114, since the cache line specified by the snoop address is not currently being evicted, as determined from the evict array 108. In particular, the snoop unit updates 136 the MESI state in the L1 cache 124 for the cache line addressed by the snoop operation 114 to Invalid. Additionally, if the cache line had a MESI state of Modified, the snoop unit writes back the cache line to memory on the memory bus prior to invalidating the cache line. Flow ends at block 408.

At block 412, the snoop unit generates a retry 152 to the microprocessor 100 bus interface unit to cause the bus interface unit to retry the snoop operation 114 on the microprocessor 100 bus. The bus interface unit responsively forwards the retry of the snoop operation 114 on the microprocessor 100 bus. Flow proceeds to block 414.

At block 414, in response to the retry generated by the bus interface unit at block 412, the agent on the microprocessor 100 bus that originally generated the snoop operation 114 re-sends the snoop operation 114 to all caches in the system. Flow returns to block 402 to service the re-tried snoop operation 114 until the evict array 108 indicates the eviction has completed.

Figure 5:
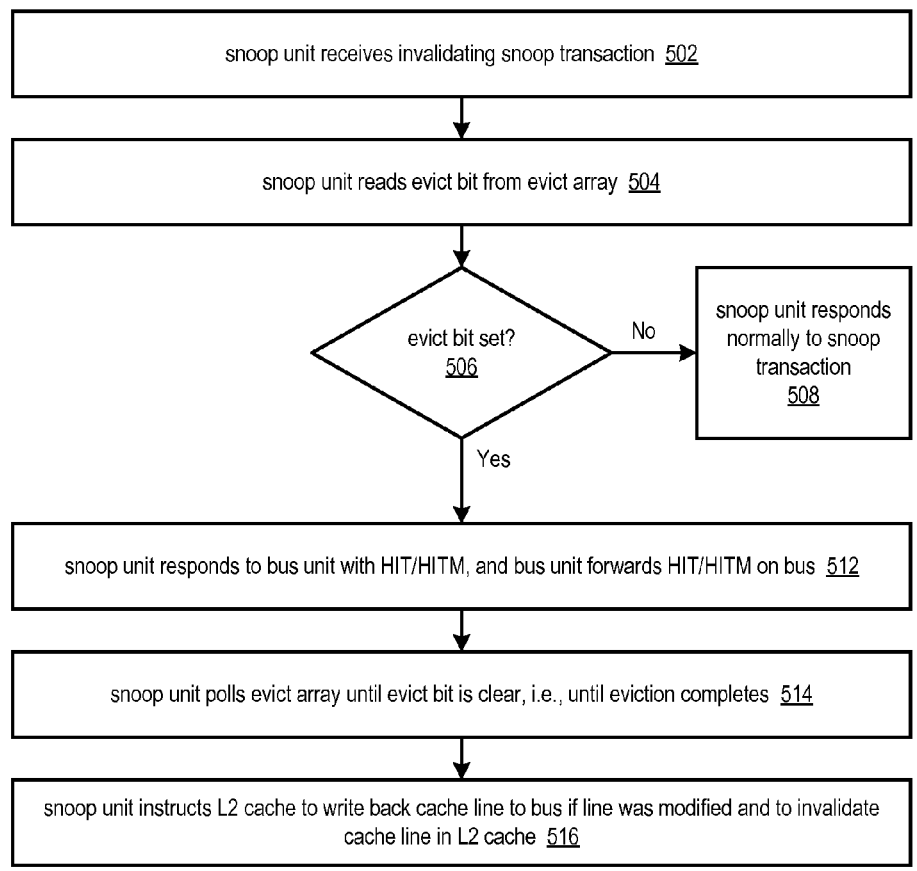
FIG. 5 is a flowchart illustrating a snoop operation of microprocessor during a cache line eviction operation according to an alternate embodiment of the present invention.

Referring now to FIG. 5, a flowchart illustrating a snoop operation 114 of microprocessor 100 during a cache line eviction operation according to an alternate embodiment of the present invention is shown. Flow begins at block 502.

At block 502, the snoop unit in the load/store/snoop units 104 receives a snoop operation 114, and responsively generates a snoop query operation, similar to block 402 of FIG. 4. Flow proceeds to block 504.

At block 504, the snoop unit reads the L1 cache tag array and evict array 108 similar to block 404 of FIG. 4. Flow proceeds to decision block 506.

At decision block 506, the snoop unit evaluates the evict bit 118 read at block 504 similar to decision block 406 of FIG. 4. If the evict bit 118 is set, then a cache line eviction operation is in progress for the cache line corresponding to the evict bit 118, and flow proceeds to block 512. If the evict bit 118 is not set, then a cache line eviction operation is in not in progress for the cache line corresponding to the evict bit 118, and flow proceeds to block 508.

At block 508, the snoop unit responds normally to the snoop operation 114, since the cache line specified by the snoop address is not currently being evicted, as determined from the evict array 108, similar to block 408 of FIG. 4. Flow ends at block 508.

At block 512, the snoop unit responds to the bus unit with a HIT or HITM, and the bus unit forwards the HIT/HITM response on the microprocessor 100 bus. HIT is generated by the snoop unit if the MESI state for the cache line is either Exclusive or Shared. HITM is generated by the snoop unit if the MESI state for the cache line is Modified. If a HITM is generated, the microprocessor 100 must write back the modified cache line from the L1 cache 124 to memory. Flow proceeds to block 514.

At block 514, the snoop unit of microprocessor 100 polls the evict array 108 until the evict bit 118 is cleared. The evict bit 118 in the evict array 108 is cleared by the eviction engine 122 when cache line eviction completes, as described above with respect to FIG. 2. Typically the evict bit 118 will be cleared the next time the snoop operation 114 is retried because the eviction will have completed. However, if not, the retry may occur again. Flow proceeds to block 516.

At block 516, the snoop unit instructs the L2 cache 126 to write back the cache line to the bus if the MESI state of the line was Modified, and to invalidate the cache line in the L2 cache 126. This embodiment makes the L2 cache 126 responsible for invalidating the cache line and performing the write back to memory of the Modified cache line. Flow ends at block 516. The present invention is implemented within a microprocessor device which may be used in a general purpose computer.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, in addition to using hardware (e.g., within or coupled to a Central Processing Unit ("CPU"), microprocessor, microcontroller, digital signal processor, processor core, System on Chip ("SOC"), or any other device), implementations may also be embodied in software (e.g., computer readable code, program code, and instructions disposed in any form, such as source, object or machine language) disposed, for example, in a computer usable (e.g., readable) medium configured to store the software. Such software can enable, for example, the function, fabrication, modeling, simulation, description and/or testing of the apparatus and methods described herein. For example, this can be accomplished through the use of general programming languages (e.g., C, C++), hardware description languages (HDL) including Verilog HDL, VHDL, and so on, or other available programs. Such software can be disposed in any known computer usable medium such as semiconductor, magnetic disk, or optical disc (e.g., CD-ROM, DVD-ROM, etc.). Embodiments of the present invention may include methods of providing a microprocessor described herein by providing software describing the design of the microprocessor and subsequently transmitting the software as a computer data signal over a communication network including the Internet and intranets. It is understood that the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the herein-described exemplary embodiments, but should be defined only in accordance with the following claims and their equivalents. The present invention is implemented within a microprocessor device which may be used in a general purpose computer.

Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. An apparatus for ensuring data coherency within a cache memory hierarchy of a microprocessor during an eviction of a cache line from a lower-level cache memory to a higher-level cache memory in the hierarchy, the apparatus comprising:
   an eviction status array, separate accessible from a tag array of the lower-level cache memory;
   wherein the tag array stores address tags for corresponding cache lines of the lower-level cache memory;
   wherein the eviction status array comprises an array of storage elements;
   wherein each of the tag array and eviction status array are accessed by an index portion of memory address; and
   an eviction engine, configured to move the cache line from the lower-level cache memory to the higher-level cache memory;
   wherein each storage element of the eviction status array is configured to store an indication for a corresponding cache line stored in the lower-level cache memory, wherein the indication indicates whether or not the eviction engine is currently moving the cache line from the lower-level cache memory to the higher-level cache memory.

2. The apparatus as recited in claim 1, wherein the eviction engine is configured to prohibit a store operation from updating the cache line until the indication indicates the eviction engine has completed moving the cache line from the lower-level cache memory to the higher-level cache memory.

3. The apparatus as recited in claim 2, wherein the eviction engine is configured to move the cache line from the higher level cache memory to the lower level cache memory prior to the store operation updating the cache line.

4. The apparatus as recited in claim 1, wherein the eviction engine is configured to permit a load operation to read the cache line even when the indication indicates the eviction engine is currently moving the cache line from the lower-level cache memory to the higher-level cache memory.

5. The apparatus as recited in claim 1, wherein the eviction engine is configured to affect a response to a snoop of the cache line when the indication indicates the eviction engine is currently moving the cache line from the lower-level cache memory to the higher-level cache memory.

6. The apparatus as recited in claim 5, wherein the eviction engine is configured to prevent the microprocessor from responding to the snoop of the cache line until the indication indicates the eviction engine has completed the move of the cache line from the lower-level cache memory to the higher-level cache memory.

7. The apparatus as recited in claim 5, wherein the eviction engine is configured to transfer responsibility to the higher-level cache memory to perform operations to respond to the snoop of the cache line if the indication indicates the eviction engine is currently moving the cache line from the lower-level cache memory to the higher-level cache memory.

8. The apparatus as recited in claim 7, wherein the operations performed by the higher-level cache memory to respond to the snoop of the cache line comprise invalidation of the cache line or providing data for a write-back invalidation of the cache line.

9. The apparatus as recited in claim 1, wherein the eviction engine is configured to set the indication to indicate it is currently moving the cache line from the lower-level cache memory to the higher-level cache memory before it begins reading the cache line from the lower-level cache memory, in preparation for transferring the cache line to the higher-level cache memory.

10. The apparatus as recited in claim 1, wherein the eviction engine is configured to clear the indication to indicate it is not currently moving the cache line from the lower-level cache memory to the higher-level cache memory when it completes moving the cache line from the lower-level cache memory to the higher-level cache memory.

11. The apparatus as recited in claim 10, wherein the higher level cache memory is configured to notify the eviction engine when the higher level cache memory is ready to take ownership of the cache line, prior to the eviction engine clearing the indication.

12. The apparatus as recited in claim 10, wherein the eviction engine is configured to invalidate the cache line in the lower level cache memory, prior to clearing the indication.

13. A method for ensuring data coherency within a cache memory hierarchy of a microprocessor during an eviction of a cache line from a lower-level cache memory to a higher-level cache memory in the hierarchy, the method comprising:
   using an index portion of it memory address to access each of tag array and an eviction status array;
   wherein the tag array comprises an array of storage elements that stores address tags for corresponding cache lines of lower-level cache memory;
   wherein the eviction status array comprises an array of storage elements that stores indications for each cache line that indicate whether or not the eviction engine is currently moving the cache line from the lower-level cache memory to the higher-level cache memory;
   wherein the eviction status array is separately accessible from the tag array;
   moving the cache line from the lower-level cache memory to the higher-level cache memory, wherein the moving is performed by an eviction engine;
   storing into the eviction status array an indication that the eviction engine is currently moving the cache line from the lower-level cache memory to the higher-level cache memory.

14. The method as recited in claim 13, further comprising:
   prohibiting a store operation from updating the cache line until the indication indicates the eviction engine has completed moving the cache line from the lower-level cache memory to the higher-level cache memory.

15. The method as recited in claim 14, further comprising:
   moving the cache line from the higher level cache memory to the lower level memory prior to the store operation updating the cache line.

16. The method as recited in claim 13, further comprising:
   permitting a load operation to read the cache line even when the indication indicates the eviction engine is currently moving the cache line from the lower-level cache memory to the higher-level cache memory.

17. The method as recited in claim 13, further comprising:
   affecting a response to a snoop of the cache line when the indication indicates the eviction engine is currently moving the cache line from the lower-level cache memory to the higher-level cache memory.

18. The method as recited in claim 17, wherein said affecting a response to a snoop of the cache line comprises preventing the microprocessor from responding to the snoop of the cache line until the indication indicates the eviction engine has completed the move of the cache line from the lower-level cache memory to the higher-level cache memory.

19. The method as recited in claim 17, wherein said affecting a response to a snoop of the cache line comprises transferring responsibility to the higher-level cache memory to perform operations to respond to the snoop of the cache line if the indication indicates the eviction engine is currently moving the cache line from the lower-level cache memory to the higher-level cache memory.

20. The method as recited in claim 19, wherein the operations performed by the higher-level cache memory to respond to the snoop of the cache line comprise invalidating the cache line or providing data for a write-back invalidation of the cache line.

21. The method as recited in claim 13, further comprising:
setting the indication to indicate the eviction engine is currently moving the cache line from the lower-level cache memory to the higher-level cache memory before the eviction engine begins reading the cache line from the lower-level cache memory, in preparation for transferring the cache line to the higher-level cache memory.

22. The method as recited in claim 13, further comprising:
clearing the indication to indicate the eviction engine is not currently moving the cache line from the lower-level cache memory to the higher-level cache memory when the eviction engine completes moving the cache line from the lower-level cache memory to the higher-level cache memory.

23. The method as recited in claim 22, wherein the higher level cache memory is configured to notify the eviction engine when the higher level cache memory is ready to take ownership of the cache line, prior to the eviction engine clearing the indication.

24. The method as recited in claim 22, further comprising:
invalidating the cache line in the lower level cache memory, prior to said clearing the indication.

25. A computer program product for use with a computing device, the computer program product comprising:
a computer usable hardware storage medium, having computer readable program code embodied in said medium, for specifying a microprocessor configured to ensure data coherency within a cache memory hierarchy of a microprocessor during an eviction of a cache line from a lower-level cache memory to a higher-level cache memory in the hierarchy, the computer readable program code comprising:
first program code for specifying an eviction status array, separately accessible from a tag array of the lower-level cache memory;
wherein the tag array stores address tags for corresponding cache lines of the lower-level cache memory;
wherein the eviction status array comprises an array of storage elements;
wherein each of the tag array and eviction status array are accessed by an index portion of a memory address; and
second program code for specifying an eviction engine, configured to move the cache line from the lower-level cache memory to the higher-level cache memory;
wherein each storage elements of the eviction status array is configured to store an indication for a corresponding cache line stored in the lower-level cache memory, wherein the indication indicates whether or not the eviction engine is currently moving the cache line from the lower-level cache memory to the higher-level cache memory.

26. The apparatus of claim 1, wherein the eviction engine comprises an eviction buffer, distinct from the eviction status array, to provide temporary storage of cache data being transferred from the lower-level cache memory to the higher-level cache memory.

27. The apparatus of claim 1, wherein the lower-level cache memory comprises a plurality of cache ways, and the eviction status array provides an eviction bit for each cache way in the lower-level cache memory.

28. The apparatus of claim 27, wherein the eviction bit is accessed by an index portion of an address used to select one of a plurality of sets of cache lines.

29. The apparatus of claim 28, wherein during each data access of the lower-level cache memory, the eviction status array outputs a number of eviction bits equal to a number of ways of the lower-level cache memory, and wherein a multiplexer at an output of the array of storage elements selects one of the outputted eviction bits in response to a select signal that indicates which of the ways has a tag matching a tag portion of the address.

30. The apparatus of claim 1, wherein the eviction status array comprises a one-to-one correspondence between each storage element and each cache line in the lower-level cache memory.

31. The apparatus of claim 1, wherein the lower-level cache memory is a set-associative cache that has a plurality of sets and a plurality of ways, and the eviction status array has a corresponding organizational structure having an equal number of sets and ways as the set-associative cache.

32. The apparatus of claim 31, wherein each data access of the lower-level cache memory results in a corresponding access of the eviction status array.

33. The method of claim 13, wherein the eviction engine comprises an eviction buffer, distinct from the eviction status array, that provides temporary storage of cache data being transferred from the lower-level cache memory to the higher-level cache memory.

34. The method of claim 13, wherein the lower-level cache memory comprises a plurality of cache ways, and wherein the eviction status array provides an eviction bit for each cache way in the lower-level cache memory.

35. The method of claim 34, further comprising accessing an eviction bit using an index portion of an address used to select one of a plurality of sets of cache lines.

36. The method of claim 35, further comprising performing a data access on the lower-level cache memory, wherein during each data access, the eviction status array outputs a number of eviction bits equal to a number of ways of the lower-level cache memory, and further comprising using a multiplexer to select one of the outputted eviction bits in response to a select signal that indicates which of the ways has a tag matching a tag portion of the address.

37. The method of claim 13, wherein the eviction status array comprises a one-to-one correspondence between each storage element and each cache line in the lower-level cache memory.

38. The method of claim 13, wherein the lower-level cache memory is a set-associative cache that has a plurality of sets and a plurality of ways, and the eviction status array has a corresponding organizational structure having an equal number of sets and ways as the set-associative cache.

39. The method of claim 38, wherein each data access of the lower-level cache memory results in a corresponding access of the eviction status array.

* * * * *